(12) United States Patent
Candy (10) Patent No.: US 12,320,947 B2
(45) Date of Patent: Jun. 3, 2025

(54) METAL DETECTOR

(71) Applicant: Minelab Electronics Pty. Limited, Mawson Lakes (AU)

(72) Inventor: Bruce Halcro Candy, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 176 days.

(21) Appl. No.: 18/128,624

(22) Filed: Mar. 30, 2023

(65) Prior Publication Data

US 2023/0314651 A1    Oct. 5, 2023

(30) Foreign Application Priority Data

Mar. 31, 2022    (AU) .................... 2022900827

(51) Int. Cl.
*G01V 3/10*      (2006.01)
(52) U.S. Cl.
CPC .................... *G01V 3/10* (2013.01)
(58) Field of Classification Search
CPC .......................................... G01V 3/10
See application file for complete search history.

(56) References Cited

U.S. PATENT DOCUMENTS

| | | | |
|---|---|---|---|
| 4,255,710 A | 3/1981 | Weber | |
| 4,439,734 A | 3/1984 | Weber | |
| 4,486,712 A | 12/1984 | Weber | |
| 4,628,265 A * | 12/1986 | Johnson | G01V 3/107 324/225 |
| 4,691,165 A * | 9/1987 | Szedlmajer | G01V 3/06 324/326 |
| 9,664,809 B2 | 5/2017 | Fry | |
| 2019/0250301 A1 | 8/2019 | Wahrlich | |
| 2020/0158906 A1 | 5/2020 | Wahrlich et al. | |

FOREIGN PATENT DOCUMENTS

| | | |
|---|---|---|
| AU | 2011265456 A1 | 7/2012 |
| WO | 2005124394 A1 | 12/2005 |
| WO | 2006037176 A1 | 4/2006 |

* cited by examiner

*Primary Examiner* — Walter L Lindsay, Jr.
*Assistant Examiner* — Milton Gonzalez
(74) *Attorney, Agent, or Firm* — The Webb Law Firm (57) ABSTRACT

A method for detecting a target using a metal detector by producing at least two different modulated audio tones, by modulating a first audio tone with a first stereo audio modulator signal and modulating a second audio tone with a second stereo audio modulator signal; and applying at least the first audio tone to a left side of an audio stereo target indicator indicative of the target, and applying at least the second audio tone to a right side of the audio stereo target indicator. The modulating of the first audio tone and modulating of the second audio tone, includes one or more of the following; a modulation of a volume of a tone, a modulation of a pitch of a tone, a modulation of relative harmonics ratios of a tone, a modulation of a chord richness of a tone.

10 Claims, 8 Drawing Sheets

METAL DETECTOR

CROSS REFERENCE TO RELATED APPLICATION

This application claims priority to Australian Provisional Patent Application No. 2022900827 filed Mar. 31, 2022, the disclosure of which is hereby incorporated by reference in its entirety.

BACKGROUND OF THE INVENTION

Field of the Invention

The present invention relates to a metal detector.

Description of Related Art

The general forms of most electronic metal detectors are either hand-held battery-operated units, conveyor-mounted units, or vehicle-mounted units. Examples of hand-held products include detectors used to locate gold, explosive land mines or ordnance, coins and treasure. Examples of conveyor-mounted units include fine gold detectors in ore mining operations, and an example of a vehicle-mounted unit includes a unit to locate buried land mines.

These electronic metal detectors consist of transmit electronics generating a repeating transmit signal cycle of a fundamental period, or, several independent fundamental periods, which are applied to a transmit inductive coil, which transmits a resulting varying magnetic field, sometimes referred to as a transmit magnetic field.

These electronic metal detectors contain receive electronics that processes a receive signal from a measured receive magnetic field, during one or more receive period during the repeating transmit signal cycle, and the receive signal is processed to produce an indicator output signal, the indicator output signal at least indicating the presence of at least a metal target within the influence of the transmit magnetic field. In all well-known hand-held metal detectors purpose built to detect metal targets buried at maximum possible depth in magnetic soils, the indicator signal is via modulation of an audible output.

Metal detectors may be classified into two groups depending on their transmit signal and synchronous demodulation (or sampling) functions, namely frequency-domain metal detectors or time-domain metal detectors. Frequency-domain metal detectors may be thought of as having signal processing that includes synchronous demodulators detecting specific frequencies of their transmit signal (and possibly harmonics to some degree), whilst time-domain metal detectors may be thought of as having synchronous demodulators detecting specific periods of time usually following transitions in a transmit signal. Examples of time-domain metal detectors are well-known pulse-induction (PI) metal detectors, or PI-like metal detectors with periods of alternating constant transmitted magnetic fields with rapid magnetic field transitions connecting the said alternate periods of constant transmitted magnetic fields. Examples of frequency-domain metal detectors include one of the most common forms of metal detectors, the single frequency sine-wave transmitting type, and, multi-frequency metal detectors that usually transmit and receive several different frequencies.

Stereo audio is known in the field of metal detection. U.S. Pat. Nos. 4,439,734A and 4,255,710A describes dual BFO metal detectors with a left and a right associated sensing coil for each, that feeds an associated left and a right headphone stereo audio, to indicate better a location of a buried target. BFO metal detectors have no ground-balancing capability. Similarly, U.S. Pat. No. 4,486,712A amplifies a receive signal magnitude imbalance to a transmit-receive coil winding null, for left and right-hand receive windings, to indicate better a location of a target as stereo audio. Such a system too has no ground-balance capability, and has poor performance in magnetic soils. U.S. Pat. No. 9,664,809 describes a coil with a 2-D array of receive windings, and discloses that the audio indicator output could be stereo, with either the left and the right audio corresponding to receives on the left and right of the coil, or, one stereo side could report ferrous and the other no-ferrous targets or some combination of the two. The patent does not teach or suggest a metal detector that ground-balances viscous remnant magnetism (VRM) log-uniform, nor log-linear superparamagnetic soil components, with resultant nulls in the received and synchronously demodulated time-constant spectrum. Linked patents WO2005/124394 and WO2006/037176 disclose two transmit windings of different diameter, and two receive winding also of different diameter, wherein the polarities of each coil may be inverted or non-inverted in different combinations during a repeating transmit/receive cycle. The associated output from each combination will yield different responses for different target buried depths. This differing depth response may be fed to the left and right of a stereo audio target indicator to provide target buried depth information, or, the stereo may provide ferrous targets to one ear and non-ferrous to another or some other combination of different target depths to left and right plus ferrous-non-ferrous discrimination. One of these linked patents discloses non-frequency dependent ground-balance (pure X compensation, not VRM nulling), that is, no nulls in any synchronously demodulated received target time-constant spectrum. As such, the potential to detect deep targets in magnetic soils is poor.

A commercial metal detector, a Nautilus DMC-IIBa, is a 14 kHz single frequency transmitting detector that was provided with stereo headphones, with the industry standard "all-metal" mode audio reported in one ear, and the industrial standard "go/no-go" audio "beep" discriminate audio reported in the other ear. The pitch is not signal level modulated, only volume in the all-metal mode, and the quiescent audio pitch for both ears is set at 240 Hz. When the discrimination action reports an "acceptable" target, a 950 Hz "beep" is reported on the discriminator side of the audio, that is, the pitch of the tone is either 240 Hz or 950 Hz. This 950 Hz "beep" is neither pitch, nor volume modulated by received signal level. Ferrous/non-ferrous discrimination for a single transmit frequency detector necessarily requires the use of a non-ground-balanced synchronous demodulation processing, and the Nautilus's all-metal channel cannot ground-balance (universally) log-uniformly distributed VRM soils with the use of a single frequency transmitter. Thus, its maximum metal target buried depth performance is poor in magnetic soils.

Magnetic soils may have relatively high permeability (for such soils, most of the soil sticks well to a magnet). Most of the magnetic materials consist of multi- or single-domain ferrites. Most of the single-domain particles are too large to exhibit viscous remnant magnetism (VRM), but most magnetic soils do contain a significant quantity of VRM superparamagnetic particles with mostly log-uniform frequency distribution over typical multi-frequency or time-domain metal detector detection bandwidths, but usually with a small log-linear distribution component in addition. The ratio of non-VRM (the "X-component") to VRM magnetically permeable components varies from location to location, very roughly as a 1/(displacement) random distribution relationship. The received signal from the magnetic soils may be many thousands of times higher than the signal from a relatively deeply buried target, and hence the soil signals need to be "ground-balanced", meaning the soil signals need to be nulled-out using signal processing, in order to detect such a metal target. Most goldfields worldwide contain magnetic soils. Typically (but by no means always), the more concentrated near surface gold (within several buried meters), the more magnetic the soils.

The fit-for-purpose high-end commercial "gold" metal detector industry has changed very considerably since its rudimentary introductions in approximately the 1970s, and this progress continues unabated. The electronics, signal processing, algorithms and accuracy of these high-end products have become considerably more complex and demanding. As a result, the R&D investment and design skills are orders of magnitude higher now than they were a few decades ago. It is imperative at this time of writing, that for a fit-for-purpose high-end commercial gold metal detector to be successful at detecting as yet unfound gold nuggets in magnetic soils in know goldfields, it must be capable of highly accurate log-uniform and log-linear distributed VRM ground-balancing, to cope with highly magnetic soils, and have yet further innovative improvements beyond the previous generation of state-of-the-art products. However, in some magnetically milder locations log-uniform frequency distributed VRM ground-balancing together with "fine" ground-balancing slightly away from log-uniform to account for log-linear frequency distributed VRM soil components, and yet higher orders too, and conductive soil components, will suffice in practice. Thus, ground-balancing at least to approximately log-uniform frequency distributed VRM soil components is required as a minimum capability, but including at least intrinsic ground-balancing to log-linear VRM coils is overtly an advantage in the more concentrated soil VRM locations. The aim of these detectors is to locate gold nuggets at the greatest possible depths in magnetic soils that the art allows. Thus, every aspect of the design needs to be innovative and well designed, including the electronics, the antennas, the audio reporting of the most subtle faint target signals, and the physical weight and ergonomics and so forth. In essence, it is known to a person skilled-in-the-art that every significant new advantage helps locate nuggets missed by other previous prospectors' searchings in the same gold fields. This invention discloses significant improvements over the extant state-of-the-art high-end gold detectors via improved audio reporting of the most subtle target signals due to signal-to-noise improvements, and psychoacoustical improvements, for locating gold nuggets or other metal targets in magnetic soils such as gold nuggets, (ordinance) land mines, or buried treasures.

SUMMARY OF THE INVENTION

According to a first aspect of the present disclosure, there is provided a method for detecting a target using a metal detector, comprising the steps of: transmitting a transmit magnetic field; receiving a receive magnetic field to produce a receive signal; processing the receive signal using at least two different functions to produce at least two different processed signals, a first processed signal (S1) and a second processed signal (S2), wherein both S1 and S2 are approximately ground-balanced to at least log-uniform distributed magnetic soil VRM components present in the receive signal derived with respect to the transmit magnetic field that is applied to the log-uniform distributed magnetic soil VRM components, and wherein nulls in a time-constant spectrum associated with the S1 with respect to the transmit magnetic field are not coincident with nulls in a time-constant spectrum associated with the S2 with respect to the transmit magnetic field; processing the S1 and the S2 to produce at least two or more different stereo audio modulator signals, such that a first stereo audio modulator signal is a continuous function including at least the S1 as an argument, and the second stereo audio modulator signal is a continuous function including at least the S2 as an argument; producing at least two different modulated audio tones, by modulating a first audio tone with the first stereo audio modulator signal and modulating a second audio tone with the second stereo audio modulator signal; and applying at least the first audio tone to a left side of an audio stereo target indicator indicative of the target, and applying at least the second audio tone to a right side of the audio stereo target indicator; wherein the modulating of the first audio tone and modulating of the second audio tone, comprises one or more of the following; a modulation of a volume of a tone, a modulation of a pitch of a tone, a modulation of relative harmonics ratios of a tone, a modulation of a chord richness of a tone.

In one form, the step of processing the S1 and the S2 to produce the at least two different modulator signals reduces or removes jump discontinuities in the stereo audio output.

In one form, jump continuities are reduced or removed for a range of magnitudes of the S1 and the S2 up to five standard deviations of background noise mean magnitudes, wherein sources of the background noise comprise one or more of electronics noise sources, EMI external noise sources, and imperfectly ground-balanced signals from magnetic soils.

In one form, the method further comprises: modulating a pitch of a left tone of a left stereo audio by the S1 and a volume of the left tone of a left stereo audio by an absolute value of the S1; and modulating a pitch of a right tone of a right stereo audio by the S2 and a volume of the right tone of a right stereo audio by an absolute value of the S2.

In one form, a quiescent offset of the pitch of the left tone is different to a quiescent offset of the pitch of the right tone.

In one form, when a magnitude of the S1 is greater than a magnitude of the S2, then modulating a pitch of a left tone of a left stereo audio by the S1; modulating a pitch of a right tone of a right stereo audio by the S2; modulating a volume of the left tone by S1; and modulating a volume of the right tone by an inverted S2; and wherein when the magnitude of the S1 is less than the magnitude of the S2, then modulating a pitch of a left tone of the left stereo audio by the S2; modulating a pitch of a right tone of the right stereo audio by the S1; modulating a volume of the left tone by the S2; and modulating a volume of the right tone by an inverted S1.

In one form, the method further comprises: modulating a pitch of a first tone by the S1; modulating a pitch of a second tone by the S2, wherein a quiescent offset of the pitch of the first tone is different to a quiescent offset of the pitch of the second tone; modulating a first volume of a left stereo audio of the first tone by the S1; modulating a second volume of a left stereo audio of the second tone by the S2; modulating a third volume of a right stereo audio of the first tone by an inverted S1; and modulating a fourth volume of a right stereo audio of the second tone by an inverted S2.

In one form, the method further comprises: modulating a volume of a left tone of a left stereo audio by the S1 when a magnitude of the S1 is greater than a magnitude of the S2; modulating the volume of the left tone of a left stereo audio by the S2 when a magnitude of the S2 is greater than a magnitude of the S1; modulating a pitch of the left tone by the S1 when a magnitude of the S1 is greater than a magnitude of the S2; modulating the pitch of the left tone by the S2 when a magnitude of the S2 is greater than a magnitude of the S1; modulating a volume of the right stereo audio by the magnitude of the S1; and modulating a pitch of a right tone of the right stereo audio by S1.

According to another aspect of the present disclosure, there is provided a metal detector configured to perform the method of the first aspect.

According to another aspect of the present disclosure, there is provided a non-transitory computer readable medium comprising instructions to perform the method of the first aspect.

BRIEF DESCRIPTION OF THE DRAWINGS

Embodiments of the present disclosure will be discussed with reference to the accompanying drawings wherein.

DESCRIPTION OF THE INVENTION

Figure 1:
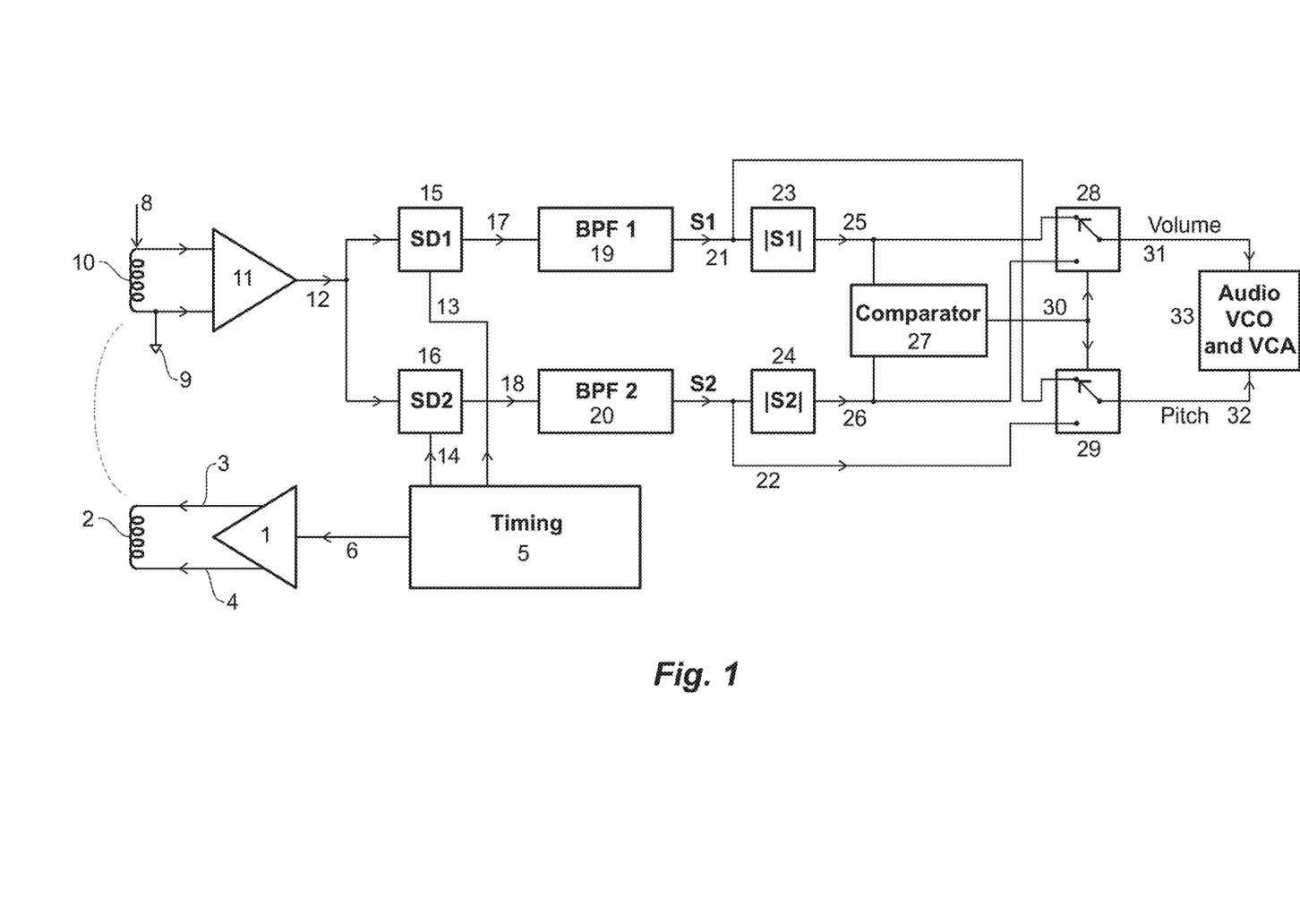
FIG. 1 shows a simplified exemplary block diagram of basic operation for an extant state-of-the-art metal detector with a coil having a separate transmit inductive winding and receive inductive winding connected to its metal detector electronics.

FIG. 1 shows a simplified exemplary block diagram of basic operation for an extant state-of-the-art metal detector in conjunction with a coil with a separate transmit inductive winding and receive inductive winding connected to its metal detector electronics. Note that this is just an example and does not exclude PI detectors using a single monoloop winding that both transmits and receives, with a T/R switch, from this invention. Transmit electronics 1 applies a transmit signal 3 and 4 to an inductive transmit winding 2, which transmits a varying transmitted field. The waveform of transmit signals at 3 and 4 are controlled by a master clock and timing generator 5, via a connection 6. A varying receive magnetic field from an environment subjected to the varying transmitted magnetic field induces a receive signal at 8 induced in an inductive receive winding 10. One end of the inductive receive winding 10 may be connected to the electronics earth 9. The receive signal at 8 is amplified by an amplifier 11 to produce an amplified output signal at 12, that is applied to inputs of synchronous demodulators (SD1) 15 and (SD2) 16. The transfer functions of these are controlled by the master clock and timing generator 5 via 13 and 14 respectively. An output 17 of the synchronous demodulator 15 is fed to bandpass filter (BPF1) 19 and an output 18 of the synchronous demodulator 16 is fed to bandpass filter (BPF2) 20. A pass-band of these bandpass filters 19 and 20, may be 0.5 Hz to 2 Hz for example, and thus their outputs in effect will be devoid of transmit related frequency components, assuming the transmit fundamental frequency is of the order of kHz. However, the filters 19 and 20 may be low pass-filters. The transfer function of synchronous demodulators 15 and 16 are both selected to effect ground-balance, and, both have different transfer functions. An output 21, "S1", of bandpass filter 19 is bipolar, and its absolute magnitude |S1| is produced at an output 25 of an absolute magnitude generator 23, and, an output 22, "S2," of bandpass filter 20 is bipolar, and its absolute magnitude |S2| is produced at an output 26 of an absolute magnitude generator 24. The signs at 25 and 26 may be inverted, if convenient, in one form. The larger of signal magnitudes at 25, |S1|, and at 26, |S2|, control an output 30 of a comparator 27, whose output 30 controls which of S1 plus |S1|, or, S2 plus |S2|, are selected to control an indicator audio monaural tone generator 33. This action is shown by means of selection switches 28 and 29, such that, the larger of the absolute value of magnitudes, |S1| versus |S2|, controls an audio volume via 31 of the indicator audio tone generator 33, whilst the respective signals, S1 or S2, controls a pitch 32 of the indicator audio tone generator 33. Thus, the instantaneous stronger mean signal at the output of the bandpass filter 19 versus that at the output of the bandpass filter 20, controls the metal detector's audio volume and pitch, all else being equal. As stated above, the ground-balanced synchronous demodulator transfer functions of 15 and 16 are different. The control of the pitch via 32 of the indicator audio tone generator 33 may be linearly deviated from a quiescent offset, or some other function such as logarithmic for example, and similarly, the control of the volume via 31 of the indicator audio tone generator 33 may be linearly deviated from a quiescent offset, or some other function such as logarithmic for example. The quiescent offset of the volume may be "positive", that is finite volume when a signal at 31=0, or "negative", that is, silent audio when the signal at 31=0, with a finite audio volume only becoming evident when a signal at 31 exceeds a value of the said "negative" offset for this latter case. An output of the indicator audio monaural tone generator 33 may be applied to an audio transducer such as headphones or a loudspeaker.

The reason for having two receive processed channels (15, 19, 23, and, 16, 20, 24) is that in order to null out the large soil VRM signal, part of the received signal (at 12) must in effect necessarily be subtracted from a different part via the synchronous demodulation functions, but this also means that part of a received signal received from transmit signal induced eddy currents in a sought metal target buried in prospected soils, is also subjected to this said subtraction process. For some metal targets with some particular time-constant spectra, this subtractive process may be nearly complete and such a metal target may be nulled-out, just as is the case with the soil signal. Thus, a different synchronous demodulator function with a different subtractive process is required such that when the one synchronous demodulator function (say that at 13), happens to effect a null to a certain metal target, the other synchronous demodulator function (that at 14), does not effect a null to the said certain metal target, or vice versa, whilst both null-out (ground-balance) the VRM signal from magnetic soils. Hence, the audio should ideally respond to all metal targets with time-constant spectra detectable within the effective receive and processed bandwidth of the metal detector, in magnetic soils containing VRM components.

Figure 2:
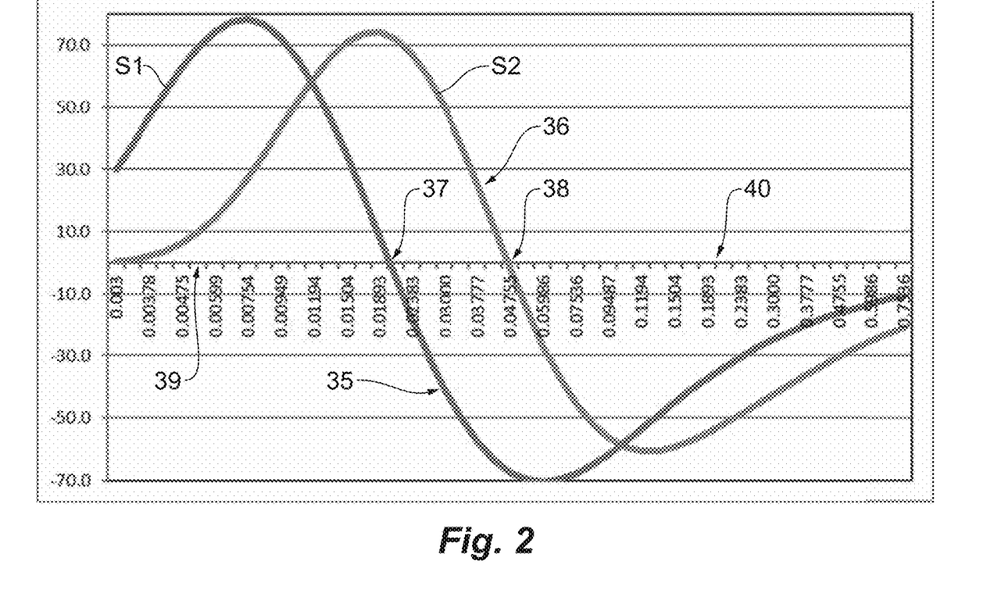
FIG. 2 shows an example of two different target time-constant spectra, resulting from two different synchronous demodulation functions that may be suitable for approximately nulling out log-uniform VRM signal magnetic soil components with respect to a given transmitted signal.

FIG. 2 shows an example of two different time-constant ("TC") spectra associated with two different synchronous demodulation functions, that may be suitable for approximately nulling out log-uniform VRM signal magnetic soil components, as a function of target time-constant, graph 35 being the TC spectrum associated with S1, and graph 36 being the TC spectrum associated with S2. The axes are in arbitrary units, not absolute units. The null of graph 35 at 37, does not coincide with the null of graph 36 at 38, and indeed, at each null (37 and 38), the alternative response is near a maximum for this example. If, for example, S1 in FIG. 1 is associated with graph 35, and S2 with graph 36, and a target with an effective single time-constant happens to present at 39, then in the time domain |S1|>|S2| in this instance, and thus the S1 signal (and thus |S1|) controls the audio (and not S2) for this detection of this target, whereas the opposite is true for a target with a time-constant at for example, 40, in which case S2 (and thus |S2|) controls the audio.

Figure 3:
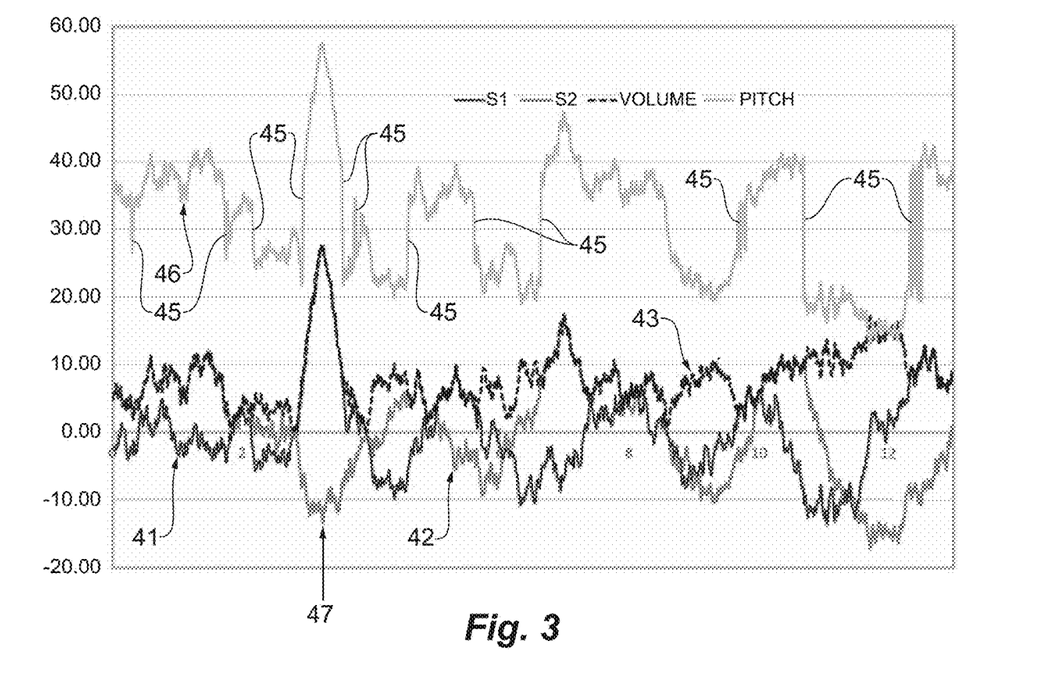
FIG. 3 shows two signals with respect to time, S1 and S2, derived from two different log-uniform distributed VRM ground-balanced functions applied to synchronous demodulators with post filtering thereof, and monoaural audio modulation functions derived from S1 and S2.

FIG. 3 shows a time trace of S1, trace 41, and S2, trace 42, with respect to time, when a detector is operated in conductive magnetic soils at high gain, and a deep target is detectable above the noise. A target is detectable at 47 and this example target happens to respond as a positive signal for the S1 synchronous demodulator plus associated filter, and a smaller negative signal for the S2 synchronous demodulator plus associated filter. Note that the audio volume (loudness parameter) 43 is "smooth", albeit with jump derivative discontinuities, whereas the audio pitch parameter 46 is discontinuous (not smooth) and "jumps" from one value to another, as indicated by 45, when S1 and S2 happen to have opposite signs and role of the lesser or greater of |S1| or |S2| swaps. These examples jump discontinuities labelled as 45 do not include all such jump discontinuities and only illustrate selected ones. The audio modulated pitch has the best psychoacoustical potential for detecting faint target signals just above the noise, but, these pitch modulated jump discontinuities are distracting to the operator and sounds "noisy", rather than "smooth", and thus can cause an operator to miss targets and possibly dig holes for "false targets". Generally, the audio volume's derivative jump discontinuities cause much less psychoacoustic problems in discerning faint targets compared to the pitch jump discontinuities.

The audio volume is selected from the greater of four variable values: namely, the greater of S1, S2, −S1 and −S2. These all have noise components of random noise due to the electronics, and EMI, and from imperfectly ground-balanced magnetic soil and soil conductive signals. Thus, because the volume modulation signal selects the larger of these four values, compared to say just the absolute value of one of either just S1 or S2, its mean background value (thus noise) is higher.

Note that S1 and S2 may be generated by various linear combinations of synchronous demodulation functions applied to Rx signal, and linear combinations of post demodulation filters: the underlying principle being that the final result is that S1 and S2 are signals at least approximately ground-balanced to log-uniform frequency distributed VRM soil receive component signals responding to the applied transmit magnetic field. Note further, that no VRM super paramagnetic soil particle time-constant distribution results in an exact log-uniform response as all magnetic soils also exhibit a small but not insignificant log-linear component, and even this is never exactly log-linear, but typically close to log-linear. Higher order distributions are always present but typically at relatively low levels. Further, some soils, especially when damp, may be significantly conductive, and the resulting eddy currents may produce spurious un-ground-balanced received and processed signals, unless the synchronous demodulation transfer functions include means to cancel out these conductive eddy current soil signals. Usually, such appropriate synchronous demodulation functions assume an ideal situation when the soil conductivity may be modelled as a conductive half-space. But this is rarely the case exactly, and yet again, even if the synchronous demodulation includes the nulling of a conductive half-space in response to the applied transmitted field, this never exactly nulls out the received signals due to the soil conductivity, but typically does null such signals reasonably satisfactorily. Yet further, no electronics is exactly accurate. Hence, in most magnetic soils, there is always at least a small unground-balanced signal, no matter what techniques are employed to cancel these magnetic and/or conductive soil signals. Hence herein, one-skilled-in the-art realises that the meaning of "the first synchronous demodulation function and the second demodulation function acts approximately to ground-balance at least log-uniform distributed VRM", is assumed to be subject to such limitations. To provide clarity, the term "approximately ground-balanced to at least log-uniform distributed magnetic soil VRM components present in the receive signal" means that a ground balancing processing function nulls out at least 95% of the log-uniform distributed magnetic soil VRM components present in the received signal, with respect to the transmit signal.

The following is a summary of the extant audio indicator art of high-end fit-for-purpose metal detectors for locating metal targets at maximum possible buried depth in magnetic soils:
1. Monaural audio (not stereo).
2. Volume modulation=larger of (|S1| and |S2|)+quiescent offset level.
3. Tone Pitch modulation=(whichever of S1 or S2 selected in point 2.)+a quiescent level.

Their Properties are:
a. Tone pitch audio parameter modulation transfer function has both jump discontinuities and derivative jump discontinuities.
b. The volume level is selected by the instantaneous values of: S1 and S2 and −S1 and −S2=total of 4 values, which follows that the pitch noise modulation level is similarly selected.

This results in a noisy audio background quiescent signal, because of point b. above, and also negatively enhanced psychoacoustically because of point a. above.

Figure 5:
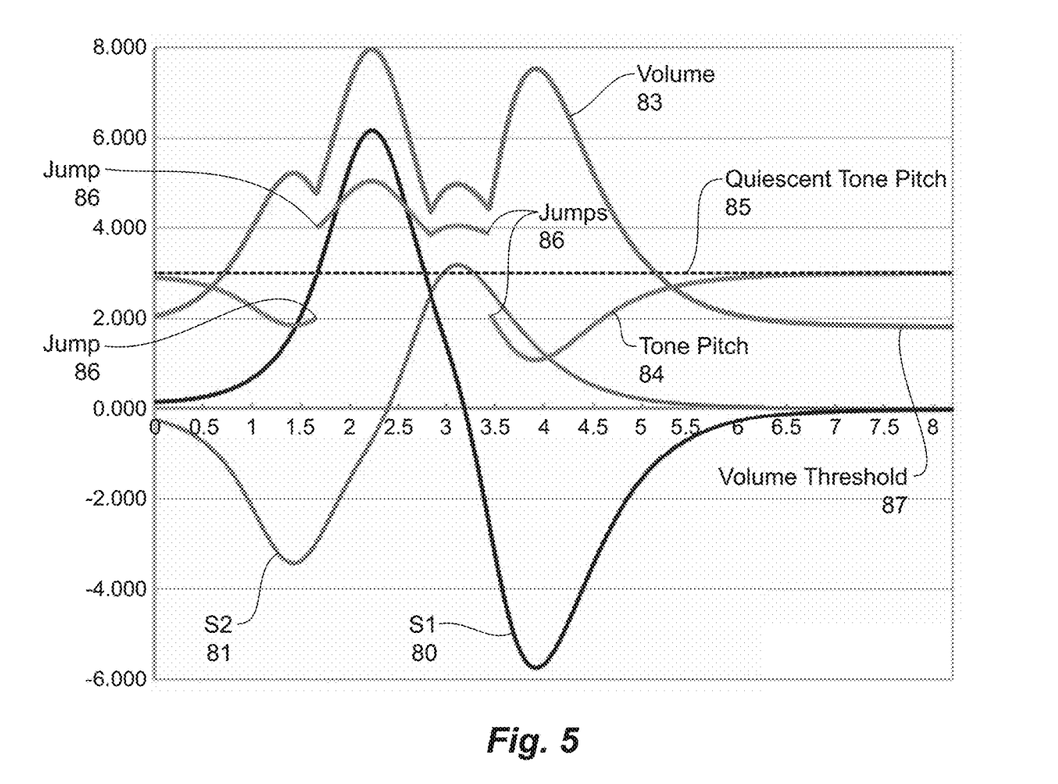
FIG. 5 illustrates S1 and S2 derived idealised monoaural audio modulation signals for some extant state-of-the-art metal detectors.

FIG. 5 shows an artificial detection of a target with no noise present in order to illustrate the salient features of operation for simplicity of understanding. This assumes that the modulation transfer functions of the audio parameters (pitch and volume of the audio tone) are linear. The X-axis is in arbitrary time units, and the Y-axis in arbitrary signal level units (e.g. scaled voltage). S1 is shown as trace 80, and S2 as 81. The resulting monaural audio volume 83, with a quiescent offset 87 (so called "threshold") of 1.8 vertical units, and tone pitch 84 with a quiescent offset 85 of 3 vertical units, generates the metal detector audio indicator tone signal. Note the jump discontinuities 86. Note, the slew rate of these jump discontinuities may be slowed down by filtering, but nevertheless, this will still produce psychoacoustic problems, and as such, herein, "jump discontinuities" is defined to include any such slew-rate reduction via filtering of such jumps.

By definition, improvements to this audio for these state-of-the-art metal detectors that are designed to locate metal targets as deep as possible in magnetic soils with significant VRM, require different innovative audio improvements. The above background state-of-the-art information suggests that ideally the properties of these improvements should include:

1. An absence of any jump discontinuities in transfer functions between at least approximately VRM ground-balanced and filtered signals, and modulated audio parameter(s), wherein the modulated audio parameters include parameters such as volume, pitch, and timbre of a tone, or smooth change in chord richness (ratios of the multi-tones).
2. A reduction in the number of input variables that drive a modulation of a said audio parameter, in order to reduce noise. That is, for example, less than the four variables S1, S2, −S1, −S2 used in the extant modulation of volume, to modulate volume and tone (or timbre etc).
3. Taking advantage of stereo over monoaural target presence reporting.

Various embodiments to achieve this are disclosed in this invention, which have been proven to have an advantage over the extant art, from buried target depths tests in magnetic soils, all else being equal. These various embodiments comply with points 1 to 3 immediately above.

A Summary of a First Embodiment is as Follow:

1. Stereo (not monaural).
2. Volume left modulation input=|S1|+quiescent offset, and the volume right modulation input=|S2|+quiescent offset.
3. Left tone pitch modulation input=S1+quiescent level 1, and the right tone pitch modulation input=S2+quiescent level 2.

Properties of the First Embodiment:

a. The pitch of the tones have no jump discontinuities nor derivative jump discontinuities.
b. The volume background noise level in each ear is less than extant art, because of the selection of just the bigger of two different values for each stereo side, either +S1, or −S1 for left, and, S2 or −S2 for right (two values each), whilst the tone is defined by only S1 for the left and only S2 for right (one value each).

Point a. (no jump discontinuities) and point b. (better signal-to-noise) thus psychoacoustical allows for an operator to detect subtler faint signals in each channel. Yet additional audio parameters may be also modulated as stated above.

In essence, S1, that is ground-balanced at least approximately to the log-uniform VRM soil component, modulates only one side (e.g. the left audio), both volume and tone pitch and/or timbre and/or richness of chords, and, S2 only the other side likewise (e.g. the right audio). The volume modulation of each side is a function of the absolute value of either S1 or S2 respectively, and the tone, their actual value (not absolute value). The resultant audio can be manifest in four different ways for the synchronous demodulation time-constant spectra shown in FIG. 2 (only approximately log-uniform VRM ground-balancing cancellation, and neither intrinsic log-linear VRM nor intrinsic conductive soil ground-balancing cancellation) that depends on the effective time-constant of a detected metal target. This is summarised in Table 1. Obviously, this results as a direct one-to-one "four-quadrant" relationship.

TABLE 1

| S1 | S2 | Left pitch | Right pitch |
|---|---|---|---|
| + | + | + | + |
| − | + | − | + |
| + | − | + | − |
| − | − | − | − |

Thus, this audio has an additional advantage of informing the user as to the likely time-constant range of the target, but only if the signals are clearly above the background noise. However, the much more important advantage over the extant art is the effective improved psychoacoustic signal-to-noise.

Figure 6:
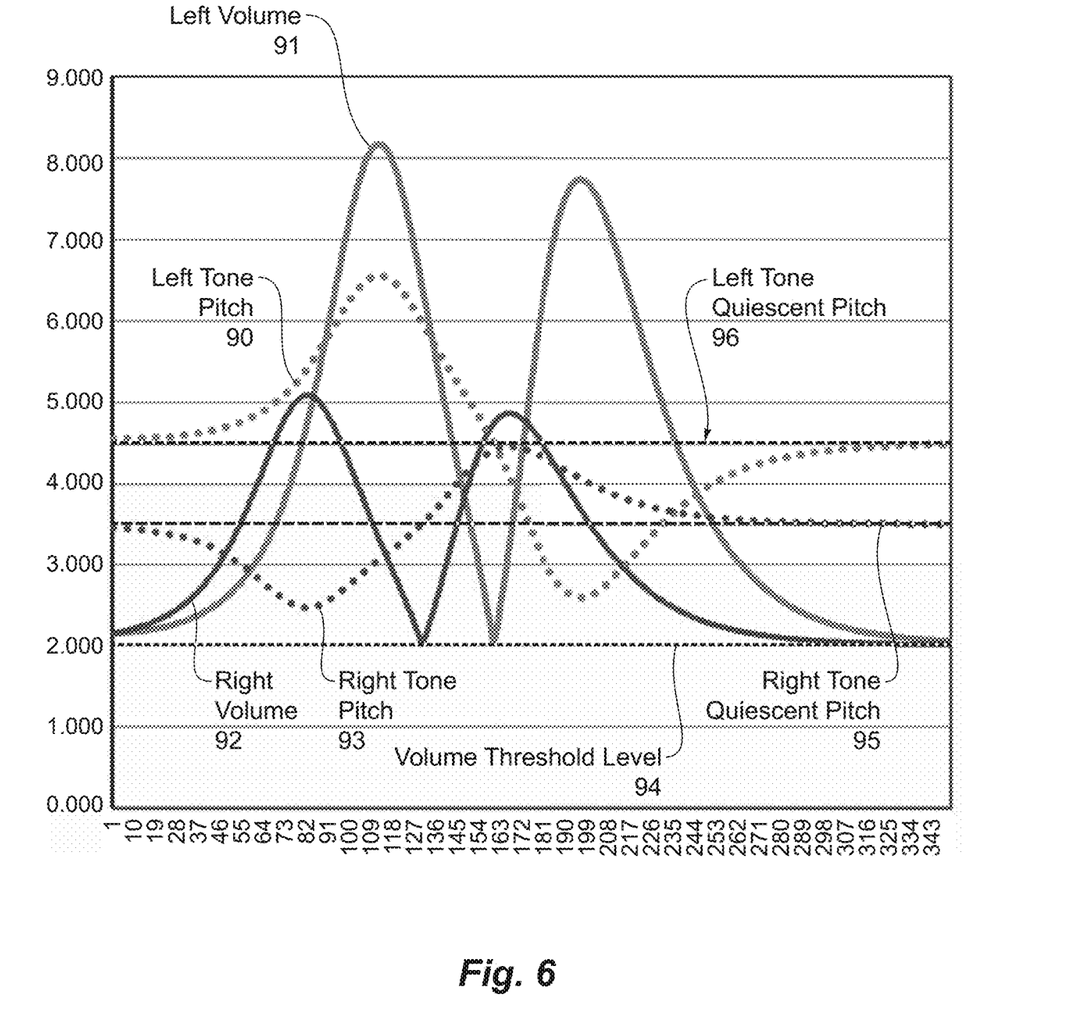
FIG. 6 illustrates a stereo audio modulation operation of the first embodiment.

FIG. 6 has the same idealised versions of S1 and S2 as FIGS. 5 (80 and 81) to illustrate operation of the first embodiment. Both the horizontal time axis and the vertical signal axis are in arbitrary units. A scaled offset version of FIG. 5's 80 (S1) and 81 (S2) in FIG. 6 modules the pitch of the left tone, 90, and the pitch of the right tone, 93. The quiescent pitch of the left tone pitch is indicated as 96 (4.5 vertical units), and the right as 95 (3.5 vertical units). The volume of the left stereo is modulated by the absolute value of S1, 91, and the volume of the right is modulated by the absolute value of S2, 92. The volume quiescent value (left and right) is indicated by 94 (2 vertical units), and this is usually referred to as the "threshold" in the jargon of the metal detector industry. However, there can be psychoacoustic advantages in having different volume offsets (thresholds) for the left and right depending on the differences of the associated ground-balancing synchronous demodulation functions associated with S1 and S2.

Figure 4:
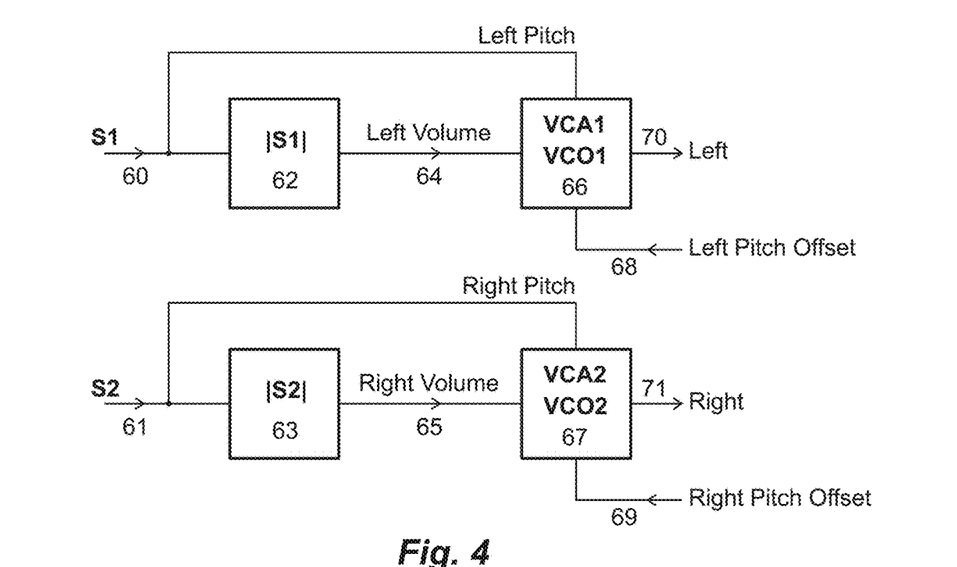
FIG. 4 shows an exemplary block diagram of the first embodiment.

An example block diagram is given in FIG. 4, that describes one possible implementation of the first embodiment, with two synchronously demodulated bandpassed signals S1 and S2 appearing at 60 and 61 respectively. The example block diagram with labels 1 to 22 in FIG. 1 is identical to this example method and the next two alternative examples of the second embodiment and the third embodiment, up until the generation of S1 and S2. Both S1 and S2 are full-wave rectified by 62 and 63 respectively, to give absolute magnitudes of S1 and S2 at 64 and 65 respectively. However, in the first embodiment, no comparison is made between |S1| and |S2|. Instead, S1 (at 60) modulates the pitch of the left audio tone, and |S1| (at 64) the volume of the left audio tone, in an audio indicator tone generator (VCA1 and VCO1) 66, to produce the left stereo audio 70. Similarly, S2 (at 61) modulates the pitch of the right audio tone, and |S2| (at 65) the volume of the right audio tone, in an audio indicator tone generator (VCA2 and VCO2) 67, to produce the right stereo audio 71. As S1 and S2 are smooth functions, so too are the audio pitch modulations, that is, they have transfer functions devoid of jump discontinuities and derivative jump discontinuities, except under conditions of overload. Here "smooth" requires clarification. If the audio pitch and volume are implemented in the digital-domain (time-discrete values), the functions cannot be "smooth", by the mathematical definition of "smooth". However, if the processing maths used to generate the digital functions are "smooth", this meaning is herein applied to the digital-domain. That is, it should sound "smooth" to the user if reasonably well implemented. Thus, each signal S1 at 60 and S2 at 61 feeds its own independent audio indicator tone generator 66 and 67 respectively, producing stereo audio resulting from two different synchronous demodulator functions, each selected to ground-balance at least approximately log-uniform distributed VRM component receive signals from the magnetic soils with respect to the transmit magnetic field. Whilst the pitch of the left and right audio tones may have associated signal transfer modulation functions that are devoid of both jump discontinuities and derivative jump discontinuities, the associated volume modulation transfer functions necessarily only have derivative discontinuities (but no actual volume jump discontinuities). The quiescent pitch of the tone in the left is best offset from the quiescent pitch of the tone in the right, in order to differentiate them easily for the listener. This is shown as quiescent offset inputs at 68 for the left and 69 for the right. The left stereo audio 70 and the right stereo audio 71 are applied to audio stereo transducers such as stereo headphones.

A VCA (Voltage Controlled Amplifier) is an amplifier that can alter the amplitude of a signal by a control voltage applied to an amplitude modulation control input of the VCA. On the other hand, a VCO (Voltage-Controlled Oscillator) is an electronic oscillator whose oscillation frequency is controlled by a voltage applied to a frequency modulation control input of the VCO. Functions of VCA and a VCO may be combined and provided by a single processor. Furthermore, the VCA and VCO functional blocks may be implemented in digital form in a software program running on a processor or in a hardware description language implemented in an FPGA or similar device.

This implementation thus avoids the psychoacoustic problems of the non-smooth audio pitch discontinuities 45 in FIG. 3 and the audio volume and pitch on each audio side has lower average noise.

A Summary of a Second Embodiment is as Follow:
1. Stereo (not monaural).
2. Left volume modulation input=larger of (+S1 or +S2)+quiescent offset, and right volume modulation input=larger of (−S1 or −S2)+quiescent offset.
3. Left tone pitch modulation input=+k*(Left volume)+quiescent level, and, the right tone pitch modulation input=quiescent level −k*(Right volume). Thus, the left pitch is mostly manifest as a modulated higher pitch, and the right pitch mostly as a lowered pitch. Both left and right pitches have the same quiescent frequency offset (or they may be different).

Properties of the Second Embodiment:
a. Both left and right pitch modulations have no jump discontinuities.
b. Target signals tend to pass from left to right ears, or vice versa.
c. Volume noise level in each ear is less than the extant art, because each stereo side volume is determined by the bigger of +S1 or +S2 for left, and −S1 or −S2 for right (two values each).
d. Similarly, each side's pitch is determined by two values.

Psychoacoustically the above points a. b. and c. should make subtle target signals more discernible above the background noise than audio produced by the extant art.

Figure 7:
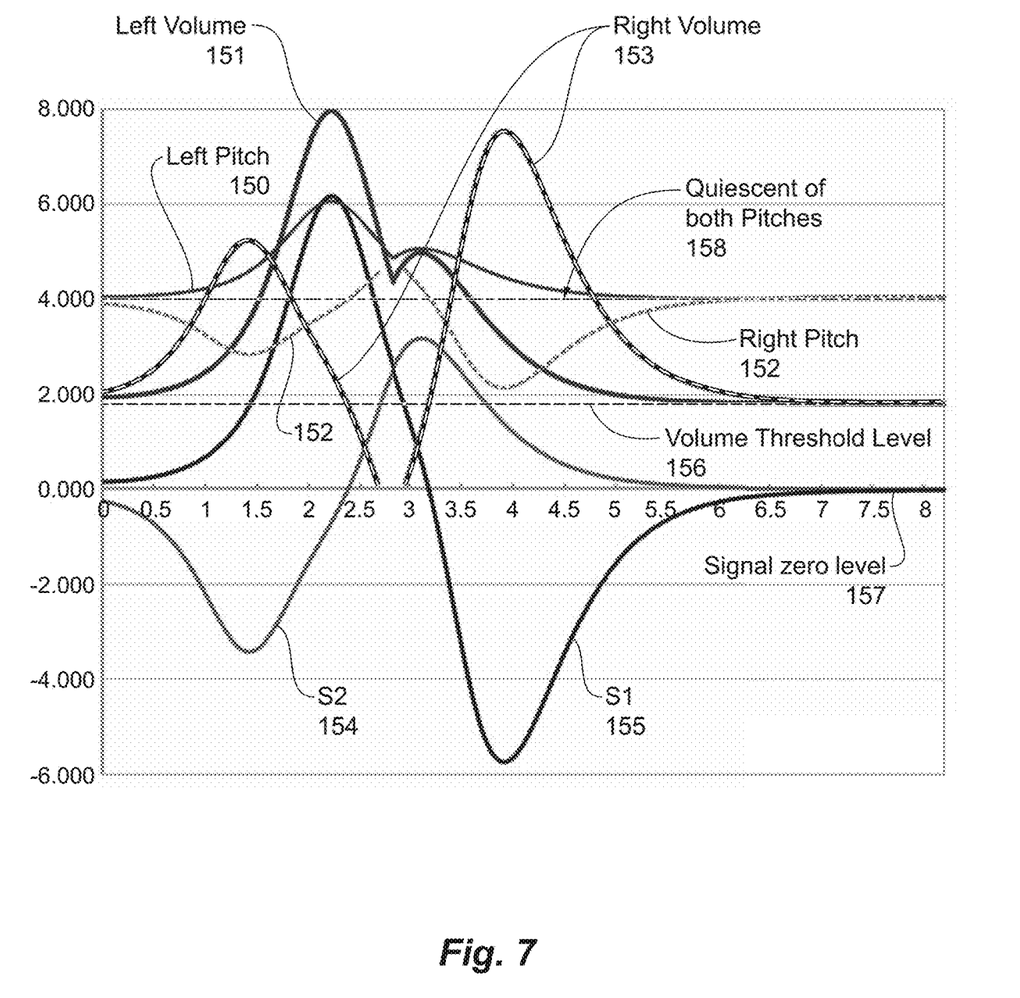
FIG. 7 illustrates S1 and S2 and derived audio modulation signals based on S1 and S2 for the second embodiment.

FIG. 7 illustrates idealized S1 and S2 signals as inputs for the second embodiment. S1 155, and S2 154, shown in FIG. 7 are the same as those in FIGS. 5 and 6. Their zero level is indicated as 157. The left stereo volume modulation signal 151, is the larger of +S1 and +S2, as is the pitch modulation 150, offset by a quiescent for both left and right pitches, shown as 158. The right stereo volume modulation signal 153, is the larger of −S1 and −S2, but its pitch modulation signal 152, is the lesser of S1 and S2 (offset by 158). The volume offset ("threshold") for both sides is shown as 156. Note in FIG. 7 the right-hand volume goes to zero between about 2.7 and 3 time units. Also note at about time=1.5, the quieter local maximum of right stereo is of lowered pitch, and at time=3.3 the softer left stereo pitch maximum at the left has elevated pitch.

For ground-balancing synchronous demodulation functions that approximately intrinsically null both log-uniform and log-linear VRM distributed soil super-paramagnetic particles, typically S1 has a substantially greater response to a wide range of different metal time-constants than S2, or, vice versa depending on which synchronous demodulation function is which. Thus, most targets solicit a larger response in S1 than S2 (or vice versa). Because of the high-pass filtering action (AC coupling) of each of S1 and S2 signals, signals from most targets thus appear to pass from one stereo side to another as the metal detector search coil is swept over a target. For example, in FIG. 7, maximum volume shifts from left, at approximately 2.3 time units, to right, at approximately 4 time units. This is accompanied by a shift in pitch from one side to the other too (higher to lower in this instance). This assists the operator in discerning the fainter target signals from above the background noise level, which is also enhanced by the lower noise as per point c. immediately above.

Figure 9:
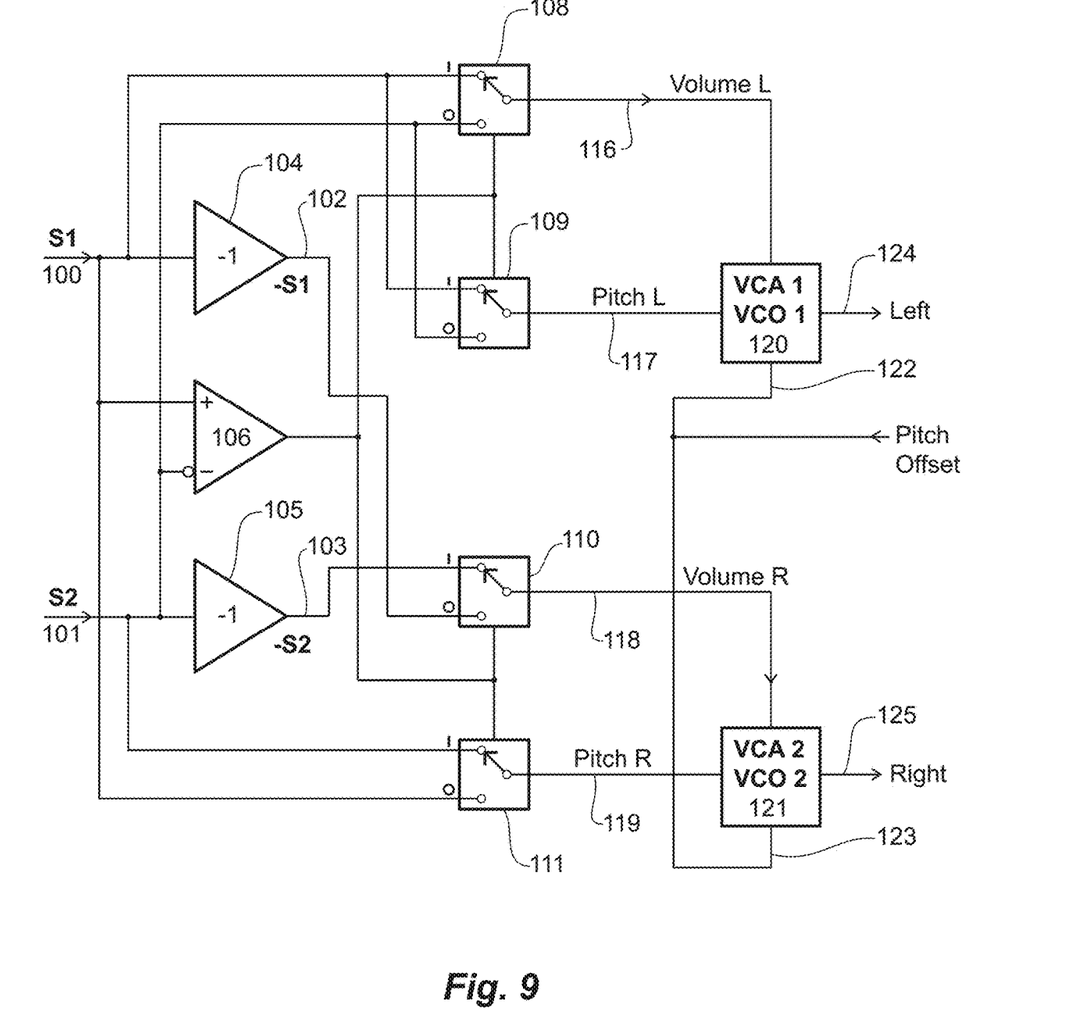
FIG. 9 shows an exemplary block diagram of the second embodiment.

FIG. 9 is an example block diagram of the audio generation for the second embodiment. This assumes the same pre-audio generation of FIG. 1 (labels 1 to 22). Inverter 104 produces −S1 at its output 102 from the S1 input 100, and inverter 105 produces −S2 at its output 103 from the S2 input 101. S1 and S2 are compared by a comparator 106, such that its output is a logic "1" if S1>S2, and a "0" if S1<S2. The output of comparator 106 feeds switching controls of switches 108, 109, 110 and 111. If the comparator output is a "1", then switches 108 and 109 select S1, switch 110 selects −S2, and switch 111 selects S2. If the comparator output is a "0", then switches 108 and 109 select S2, switch 110 selects −S1, and switch 111 selects S1. The signal output at 116 of switch 108 modulates the volume of the left stereo tone in audio indicator tone generator (VCA1 and VCO1) 120, and the signal output 117 of switch 109 modulates the pitch of the same left stereo tone in audio indicator tone generator (VCA1 and VCO1) 120. (Note the signals at 116 and 117 are the same.) The signal output at 118 of switch 110 modulates the volume of the right stereo tone in audio indicator tone generator (VCA2 and VCO2) 121, and the signal output at 119 of switch 111 modulates the volume of the same right stereo tone in audio indicator tone generator (VCA2 and VCO2) 121. The left and right pitch offsets are indicated by a level at 122 and 123. These may be the same or different. The outputs 124 and 125 of audio indicator tone generator (VCA1 and VCO1) 120 and audio indicator tone generator (VCA2 and VCO2) 121 respectively may be applied to stereo audio transducers such as stereo headphones.

A Summary of a Third Embodiment is as Follow:
1. Stereo (not monaural)
2. Left volume modulation input=(S1 at pitch=quiescent1+K*S1)+(S2 at pitch=quiescent1+K*S2)+a volume quiescent offset, and, right volume modulation input=(−S1 at pitch=quiescent1+K*S1)+(−S2 at pitch=quiescent 2+K*S2)+a volume quiescent offset. Here K=pitch modulation gain constant, but the value of K may vary between left or right or S1 or S2.

Properties of the Third Embodiment:
a. Tones have neither jump discontinuities nor derivative jump discontinuities (except for overloads).
b. Target signals tend to pass from left to right ears, or vice versa.
c. Audio is more complex than the extant art, when signal levels are low, with signal-to-noise of the volume and pitch for each tone being best of all methods and extant art, being determined by a selection of just one variable per parameter for each dual pitched tone on each stereo side.

Psychoacoustically the above points a. b. and c. should make subtle target signals more discernible than audio produced by the extant art.

Figure 8:
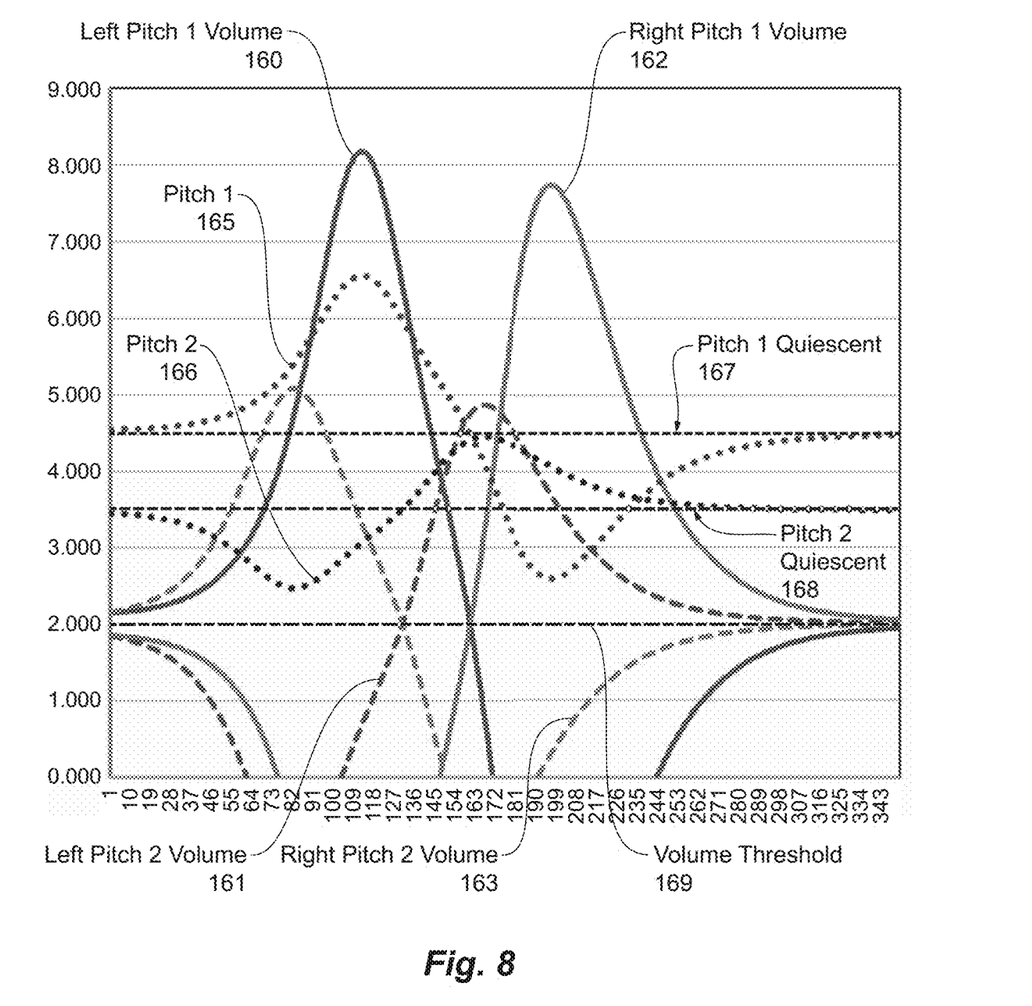
FIG. 8 illustrates S1 and S2 derived audio modulation signals for the third embodiment.

FIG. 8 shows an idealised target signal response, wherein no noise is shown to simplify the understanding of operation of audio generation. The horizontal time axis is in arbitrary units and likewise the signal vertical scale. The S1 and S2 inputs for FIG. 8 are the same as those for FIGS. 5 (80 and 81) and FIGS. 7 (155 and 154), and a scaled offset version 165 of S1 in FIG. 8 modulates one pitch, pitch 1, and a scaled different offset version 166 of S2 in FIG. 8 modulates another pitch, pitch 2. Pitch 1 quiescent offset is shown as 167 (4.5 vertical units), and that of pitch 2 as 168 (3.5 vertical units). The volume 160 of the pitch 1 tone in the left stereo is modulated by S1, and the volume 161 of the pitch 2 tone in the left stereo is modulated by S2, whereas, the volume 162 of the pitch 1 tone in the right stereo is modulated by −S1, and the volume 163 of the pitch 2 tone in the right stereo is modulated by −S2. The quiescent volume level 169 ("threshold") is set to be the same for all four volume levels, but this need not be the case. Note at about 73-91 time units, the quieter local maximum volume of pitch 2 occurs in the right stereo with lowered pitch, and at about 163-181 time units, the softer local maximum volume of pitch 2 in the left stereo occurs with elevated pitch. At about 109 time units, maximum volume is at the left, shifting to a right local high at approximately 195 time units, while the left pitch shifts from a high at around 109 time units to a right low at about 195 time units.

Figure 10:
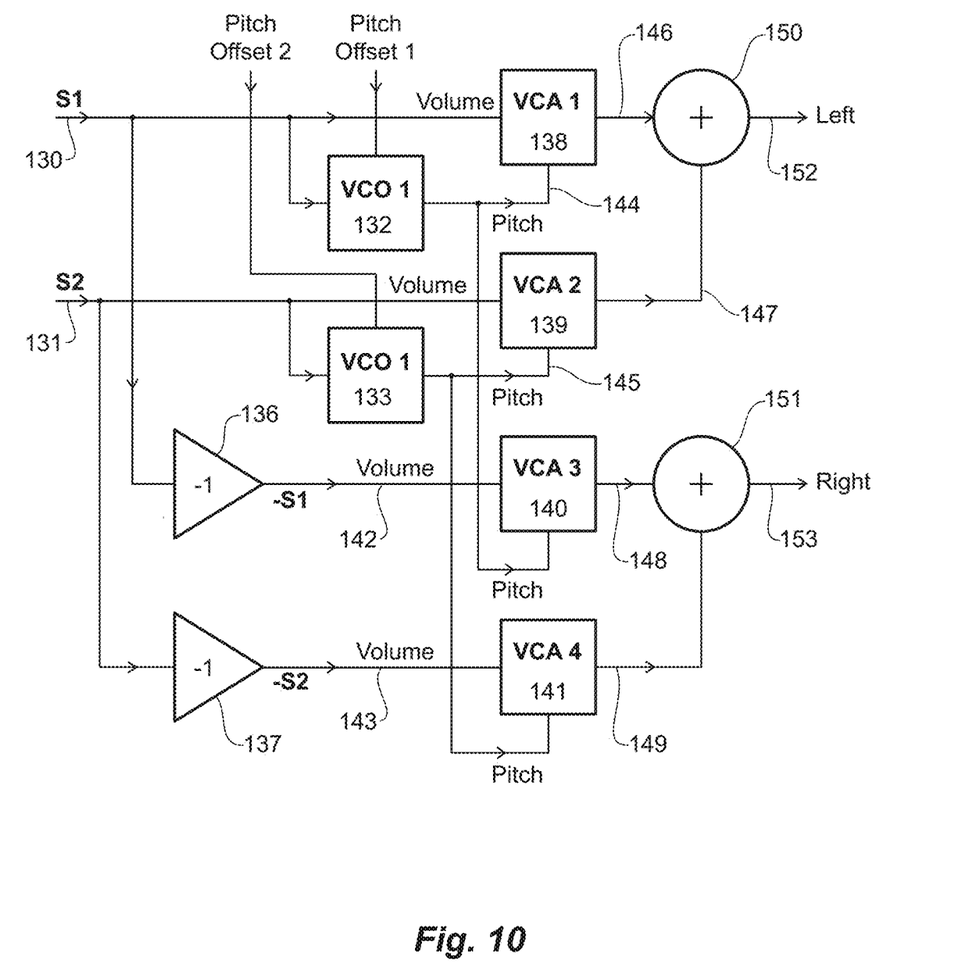
FIG. 10 shows an exemplary block diagram of the third embodiment.

FIG. 10 is an example block diagram of the stereo audio generation of the third embodiment. The pre-audio block diagram of FIGS. 1 (1 to 22) precedes this audio stage. In FIG. 10, the S1 input 130 modulates a volume of an audio controller 138 (VCA1) to produce a first tone left stereo signal, and S1 130 also modulates the pitch of a tone generator 132 (VCO1), to produce a first tone 144 which feeds an input of VCA1 138, and an input of audio controller 140 (VCA3). The S2 input 131 modulates a volume of an audio controller 139 (VCA2) to produce a second tone left stereo signal, and S2 131 also modulates the pitch of a tone generator 133 (VCO2), to produce a second tone 145 which feeds an input of VCA2 139, and an input of audio controller 141 (VCA4). S1 130 and S2 131 are also each inverted by inverters 136 and 137 to produce a −S1 output 142 and a −S2 output 143 respectively. −S1 142 modulates a volume of the first tone 144 in the audio controller VCA3 140 to produce a first tone right stereo signal 148, and −S2 143 modulates the volume of the second tone signal 145 in the audio controller VCA4 141 to produce a second tone right stereo signal 149, and these output signals at 148 and 149 are added in an adder 151 to produce a right stereo audio indicator output 153. Similarly, output signals at 146 and 147 are added in an adder 150 to produce a left stereo audio indicator output 152. The right stereo audio indicator output 153 and the left stereo audio indicator output 152 may be applied to a stereo audio transducer such as stereo headphones.

TABLE 2

Overall summary:

| | Mono Stereo | Tones pitches | Tones at threshold in each ear | Number of tone quiescent values | Tone jump discontinuity | Volume shift from L to R or R to L | Tone shift from R to L or L to R |
|---|---|---|---|---|---|---|---|
| Extant art | M | 1 | 1 | 1 | Yes | No | No |
| First Embodiment | S | 2 | 1 | 2 | No | No | No |
| Second Embodiment | S | 2 | 1 | 1 | No | Yes | Yes[1] |
| Third Embodiment | S | 2 | 2 | 2 | No | Yes | Yes |

Note 1:
Left modulated pitch mostly shifts higher, right modulated pitch mostly shifts lower.

TABLE 3

Compares the three example methods to the art of extant audio, for use in high-end detectors designed for maximum target buried depth in concentrated VRM magnetic soils, all else being equal.

| | Volume noise relative to extant art | Pitch noise of each tone relative to GPX/Z, ignoring jump discontinuities | Psychoacoustic smoothness | Psychoacoustic complexity |
|---|---|---|---|---|
| Extant | | | Poor | Complex because of jump discontinuities |
| First Embodiment | Lower | Lower | Smooth | Not complex |

TABLE 3-continued

Compares the three example methods to the art of extant audio, for use in high-end detectors designed for maximum target buried depth in concentrated VRM magnetic soils, all else being equal.

| | Volume noise relative to extant art | Pitch noise of each tone relative to GPX/Z, ignoring jump discontinuities | Psychoacoustic smoothness | Psychoacoustic complexity |
|---|---|---|---|---|
| Second Embodiment | Lower | Lower | Smooth | Not complex |
| Third Embodiment | Lowest | Lower | Smooth | Complex |

In practice these improved audio arrangements, first to third embodiments, are reported by experienced gold prospectors to be more "natural", "less noisy" and provides "more information" (whether "to dig" or "not to dig") than the audio of the extant state-of-the-art high-end maximum buried depth in magnetic soils capability metal detectors, all else being equal.

This modulation of the audio parameters (volume, pitch, timbre, chord richness) transfer functions may be linear or some other function: for example, logarithmic, or piecewise logarithmic.

In all the exemplary embodiments, various signs can be inverted, gains changed, thresholds changed, channels swapped etc if convenient and appropriate for the particular architecture. The tones' timbre, and/or chord richness, may be modulated in addition for extra signal enhancement (or instead of only the volume and tone pitch). The tones may be single frequencies or chords.

In another alternative embodiment, one stereo audio side may include tone jump discontinuities, whilst the other may not. For example, the left stereo channel may be defined as: Left volume is related to the "instantaneous" larger of |S1| and |S2| (such as linearly related with a quiescent offset), and its tone is related to S1 if |S1|>|S2|, or S2 if the other way around (again for example such as linearly related with a quiescent offset). Whereas the right stereo's volume is related only to say |S1| and its tone only to S1. This may be useful using log-linear VRM demodulation functions wherein say S2 has more time constant nulls than S1, and typically S1 has on average greater sensitivity to target TC across the range of detectable target time constants than S2, all else being equal. Hence |S2| more often is less than |S1| when detecting a target and thus could tend on average to reduce the perceived S/N ratio to some metal detector operators using such a system. This embodiment may be perceived by some operators of a stereo audio metal detector to be psychoacoustically beneficial, compared to the other embodiments. This is because when |S1|>|S2| whilst detecting most targets, and also whilst detecting conductive soils if the demodulation function does not cancel out conductive half-space signals, and also typically VRM that does not accurately null out log-linearly distributed VRM, the operator will receive monaural audio, but less often, actual stereo distinct audio. This embodiment may the implemented by having the left-hand audio stereo side operates as per FIG. 1, whereas the right-hand stereo audio side operates as per the right-hand audio side of FIG. 4, but with S1 and S2 swapped.

The aim of fit-for-purpose high-end detectors for locating metal targets at maximum buried depth in magnetic soils is target detection. Thus, quite what the audio may do if the target signal is much higher than the background noise, that is, when a detected buried target is shallower than its maximum detectable buried depth, is in effect of no consequence, other than aesthetics. Here the noise includes electronic noise, detected external EMI sources, and imperfectly ground-balanced soil signals. Thus, in fact if there happen to be audio parameter jump discontinuities when the target signal is clearly obvious above that of the noise, this does not detract from the aim of the detector, and is irrelevant to the improvements addressed by this invention. This invention addresses improvements only for the detection of targets near or at maximum detection depth, and should be interpreted as such. It is in this relatively low signal-to-noise ratio regime that this invention claims avoidance of audio parameter modulation jump discontinuities and improved audio signal-to-noise ratio, to improve maximum buried target detection depth in magnetic soils. For example, "relatively low (target) signal-to-noise ratio regime" could mean a range of magnitudes of the larger of S1 or S2 up to five standard deviations of background noise mean magnitudes, wherein sources of the background noise comprise one or more of electronics noise sources, EMI external noise sources, and imperfectly ground-balanced signals from magnetic soils.

To avoid any ambiguity, the invention described herewith may also be applied to a continuous wave (CW) metal detector.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It will be understood that the terms "comprise" and "include" and any of their derivatives (e.g. comprises, comprising, includes, including) as used in this specification is to be taken to be inclusive of features to which the term refers, and is not meant to exclude the presence of any additional features unless otherwise stated or implied The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method for detecting a target using a metal detector, comprising the steps of:
    transmitting a transmit magnetic field;
    receiving a receive magnetic field to produce a receive signal;
    processing the receive signal using at least two different functions to produce at least two different processed signals, a first processed signal (S1) and a second processed signal (S2), wherein both S1 and S2 are approximately ground-balanced to at least log-uniform distributed magnetic soil VRM (Viscous Remnant Magnetism) components present in the receive signal derived with respect to the transmit magnetic field that is applied to the log-uniform distributed magnetic soil VRM components,
    and wherein nulls in a time-constant spectrum associated with the S1 with respect to the transmit magnetic field are not coincident with nulls in a time-constant spectrum associated with the S2 with respect to the transmit magnetic field;
    processing the S1 and the S2 to produce at least two or more different stereo audio modulator signals, such that a first stereo audio modulator signal is a continuous function including at least the S1 as an argument, and the second stereo audio modulator signal is a continuous function including at least the S2 as an argument;
    producing at least two different modulated audio tones, by modulating a first audio tone with the first stereo audio modulator signal and modulating a second audio tone with the second stereo audio modulator signal; and
    applying at least the first audio tone to a left side of an audio stereo target indicator indicative of the target, and applying at least the second audio tone to a right side of the audio stereo target indicator;
    wherein the modulating of the first audio tone and modulating of the second audio tone, comprises one or more of the following: a modulation of a volume of a tone, a modulation of a pitch of a tone, a modulation of relative harmonics ratios of a tone, a modulation of a chord richness of a tone.

2. The method of claim 1, wherein the step of processing the S1 and the S2 to produce the at least two different modulator signals reduces or removes jump discontinuities in the stereo audio output.

3. The method of claim 2, wherein jump continuities are reduced or removed for a range of magnitudes of the S1 and the S2 up to five standard deviations of background noise mean magnitudes, wherein sources of the background noise comprise one or more of electronics noise sources, EMI external noise sources, and imperfectly ground-balanced signals from magnetic soils.

4. The method of claim 1, further comprising:
modulating a pitch of a left tone of a left stereo audio by the S1 and a volume of the left tone of a left stereo audio by an absolute value of the S1; and
modulating a pitch of a right tone of a right stereo audio by the S2 and a volume of the right tone of a right stereo audio by an absolute value of the S2.

5. The method of claim 4, wherein a quiescent offset of the pitch of the left tone is different to a quiescent offset of the pitch of the right tone.

6. The method of claim 1, wherein when a magnitude of the S1 is greater than a magnitude of the S2, then
modulating a pitch of a left tone of a left stereo audio by the S1;
modulating a pitch of a right tone of a right stereo audio by the S2;
modulating a volume of the left tone by S1; and
modulating a volume of the right tone by an inverted S2;
and wherein when the magnitude of the S1 is less than the magnitude of the S2, then
modulating a pitch of a left tone of the left stereo audio by the S2;
modulating a pitch of a right tone of the right stereo audio by the S1;
modulating a volume of the left tone by the S2; and
modulating a volume of the right tone by an inverted S1.

7. The method of claim 1, further comprising:
modulating a pitch of a first tone by the S1;
modulating a pitch of a second tone by the S2, wherein a quiescent offset of the pitch of the first tone is different to a quiescent offset of the pitch of the second tone;
modulating a first volume of a left stereo audio of the first tone by the S1;
modulating a second volume of a left stereo audio of the second tone by the S2;
modulating a third volume of a right stereo audio of the first tone by an inverted S1; and
modulating a fourth volume of a right stereo audio of the second tone by an inverted S2.

8. The method of claim 1, further comprising:
modulating a volume of a left tone of a left stereo audio by the S1 when a magnitude of the S1 is greater than a magnitude of the S2;
modulating the volume of the left tone of a left stereo audio by the S2 when a magnitude of the S2 is greater than a magnitude of the S1;
modulating a pitch of the left tone by the S1 when a magnitude of the S1 is greater than a magnitude of the S2;
modulating the pitch of the left tone by the S2 when a magnitude of the S2 is greater than a magnitude of the S1;
modulating a volume of the right stereo audio by the magnitude of the S1; and
modulating a pitch of a right tone of the right stereo audio by S1.

9. A metal detector configured to perform the method of claim 1.

10. A non-transitory computer readable medium comprising instructions to perform the method of claim 1.

* * * * *